(12) United States Patent
Grieshaber

(10) Patent No.: US 9,341,077 B2
(45) Date of Patent: May 17, 2016

(54) ASSEMBLY COMPRISING A SHAFT SEAL

(75) Inventor: Dirk Grieshaber, Wesel (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 796 days.

(21) Appl. No.: 13/695,204

(22) PCT Filed: Apr. 28, 2011

(86) PCT No.: PCT/EP2011/056708
§ 371 (c)(1),
(2), (4) Date: Dec. 12, 2012

(87) PCT Pub. No.: WO2011/135016
PCT Pub. Date: Nov. 3, 2011

(65) Prior Publication Data
US 2013/0115049 A1 May 9, 2013

(30) Foreign Application Priority Data
Apr. 30, 2010 (DE) .......................... 10 2010 018 873

(51) Int. Cl.
*F01D 11/00* (2006.01)
*F01D 25/00* (2006.01)
*F01D 11/02* (2006.01)
*F16J 15/34* (2006.01)
*F02C 7/28* (2006.01)

(52) U.S. Cl.
CPC .............. *F01D 25/00* (2013.01); *F01D 11/003* (2013.01); *F01D 11/005* (2013.01); *F01D 11/02* (2013.01); *F02C 7/28* (2013.01); *F16J 15/342* (2013.01); *F05D 2240/55* (2013.01)

(58) Field of Classification Search
CPC ....... F01D 11/005; F01D 11/02; F01D 25/00; F05D 2240/55; F02C 7/28; F16J 15/342
See application file for complete search history.

(56) References Cited

U.S. PATENT DOCUMENTS

| | | | |
|---|---|---|---|
| 3,880,434 A | 4/1975 | Echard et al. | |
| 6,182,971 B1 * | 2/2001 | Parker et al. | 277/348 |
| 6,325,382 B1 * | 12/2001 | Iwamoto et al. | 277/368 |
| 6,454,268 B1 * | 9/2002 | Muraki | 277/361 |
| 6,524,059 B1 * | 2/2003 | Nogiwa | 415/26 |
| 7,854,584 B2 * | 12/2010 | Lusted et al. | 415/111 |
| 8,651,801 B2 * | 2/2014 | Shamseldin et al. | 415/112 |

FOREIGN PATENT DOCUMENTS

| | | |
|---|---|---|
| DE | 202008003418 U1 | 5/2008 |
| DE | 102008048942 A1 | 4/2010 |
| EP | 2063156 A1 | 5/2009 |
| JP | 2006083889 A | 3/2006 |
| RU | 80209 U1 | 1/2009 |
| WO | WO 2010034605 A1 | 4/2010 |

* cited by examiner

*Primary Examiner* — Ninh H Nguyen

(57) ABSTRACT

A shaft seal includes more than one sealing module, at least one fluid supply and a fluid discharge, and a main seal which is subject to a greatest partial pressure difference. A second main seal is a radial double seal, which includes two gas seals, each gas seal having a rotating sealing surface and a stationary sealing surface, wherein the two sealing surface pairs are located opposite each other in a sealing plan, and wherein the two sealing planes have substantially radial extension to the shaft.

11 Claims, 4 Drawing Sheets

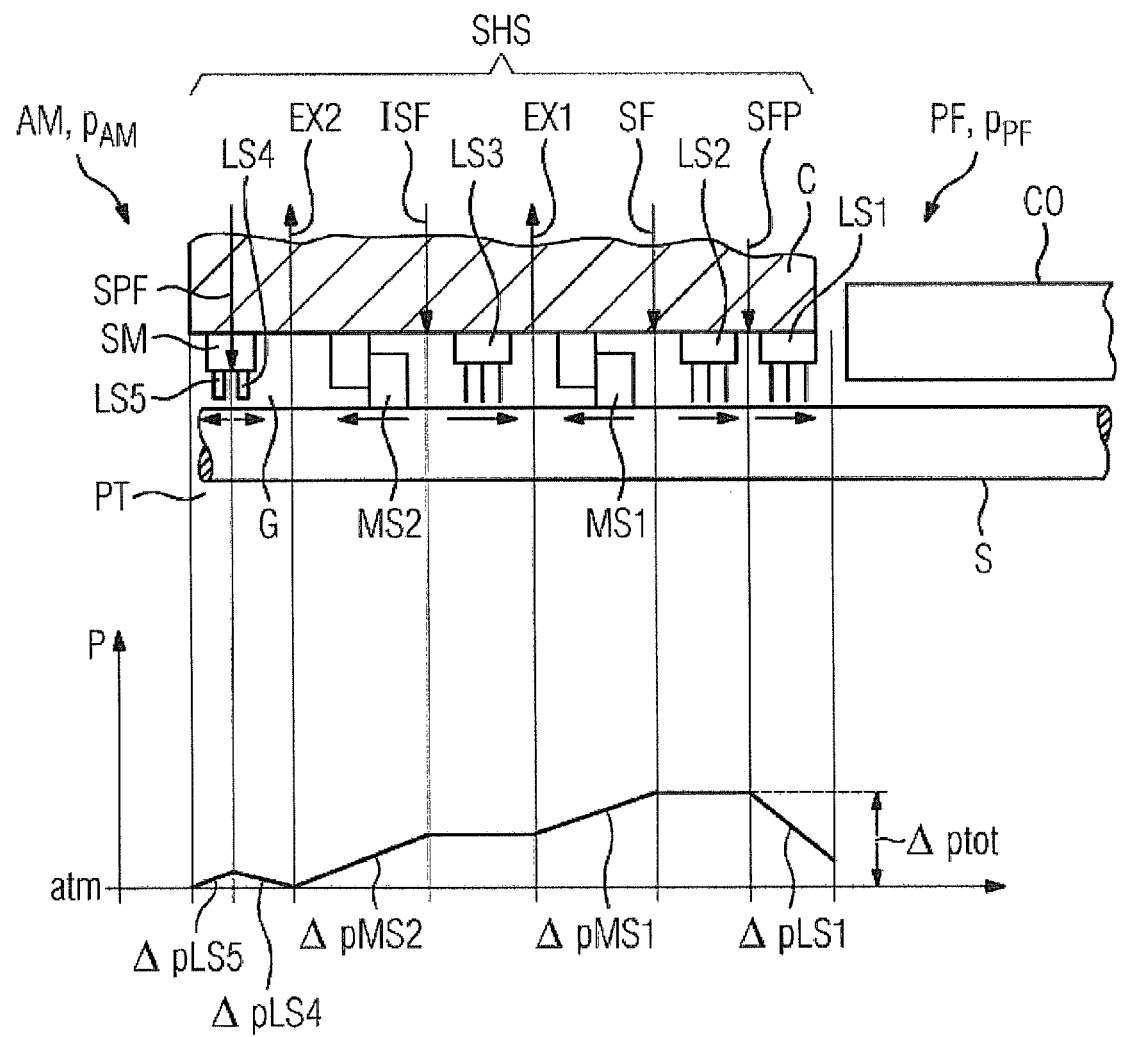

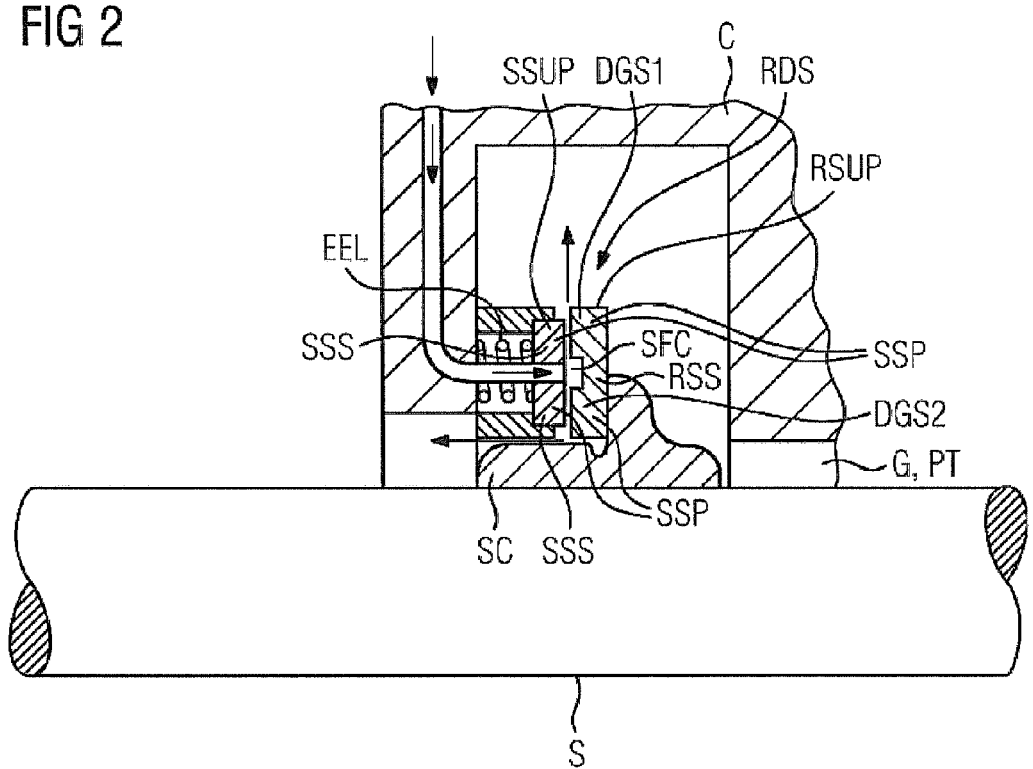

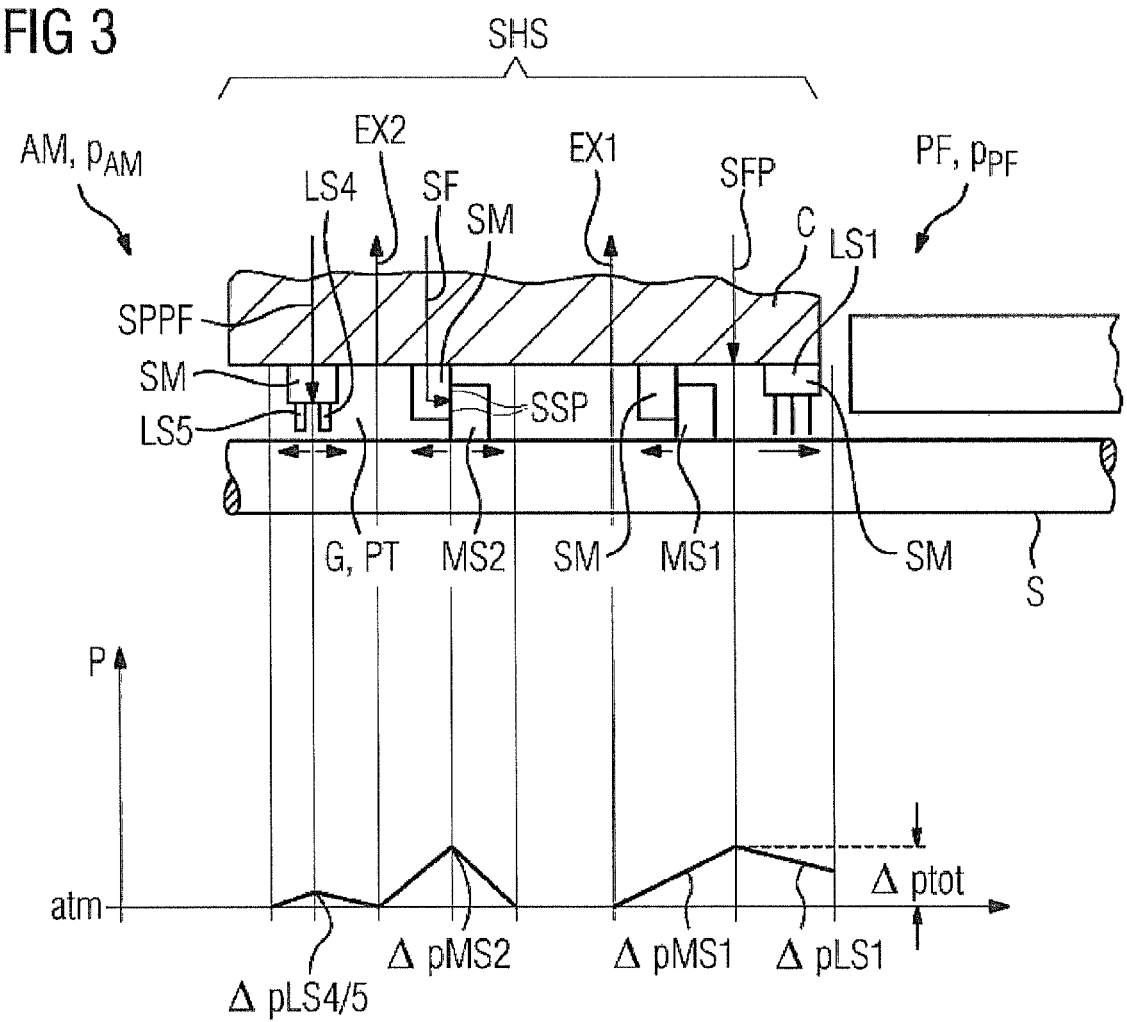

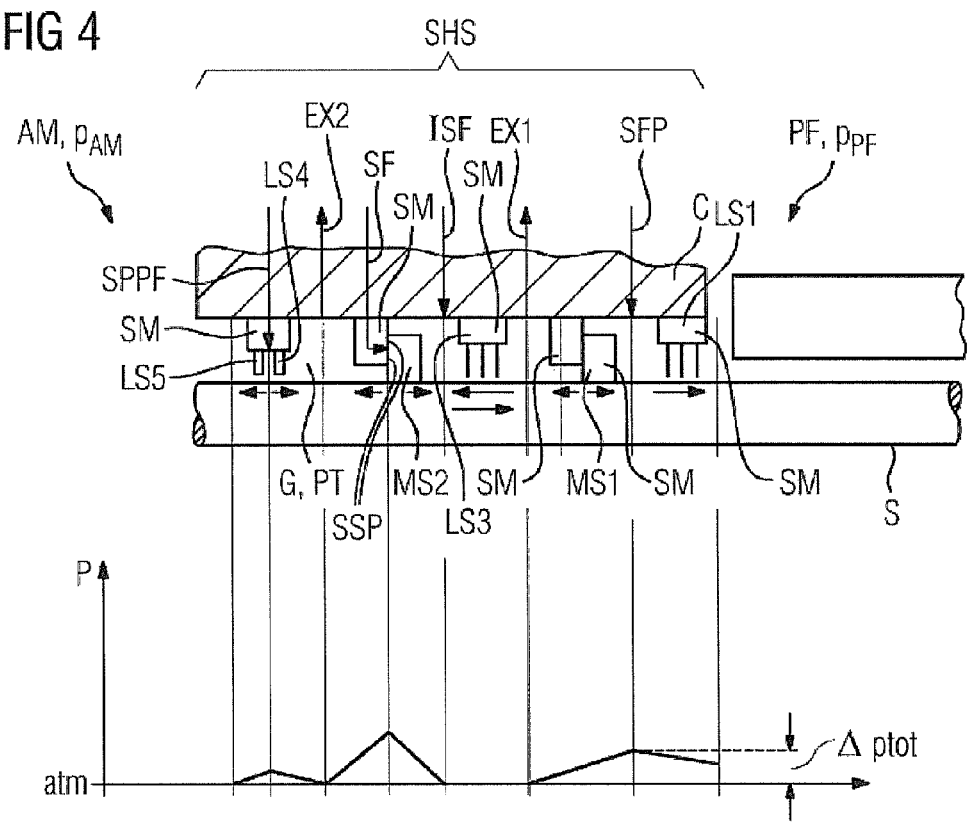

ASSEMBLY COMPRISING A SHAFT SEAL

CROSS REFERENCE TO RELATED APPLICATIONS

This application is the US National Stage of International Application No. PCT/EP2011/056708 filed Apr. 28, 2011, and claims the benefit thereof. The International Application claims the benefits of German Application No. 10 2010 018 873.5 DE filed Apr. 30, 2010. All of the applications are incorporated by reference herein in their entirety.

FIELD OF INVENTION

The invention relates to a shaft seal for sealing a gap of a penetration of a shaft through a casing, wherein the rotating and stationary elements of the seal form a sealing module, wherein in the interior of the casing there is a process fluid under a sealing pressure, and outside the casing there is an ambient fluid under an ambient pressure, wherein the shaft seal comprises more than one sealing module, at least one fluid feed and a fluid drain, wherein the ambient pressure differs from the sealing pressure by a pressure differential in the operating state, which pressure differential, split into proportions, is applied to the individual sealing modules in each case as a partial pressure differential, wherein the sealing modules comprise at least one first main seal which is designed in such a way that, during normal, trouble-free operation and during starting and shutting down, the greatest partial pressure differential is applied to this, starting from the highest pressure level from the inside outwards, wherein the sealing modules comprise at least one second main seal which is designed in such a way that, in the event of a malfunction of the first main seal, the greatest partial pressure differential is applied to this second main seal, starting from the highest pressure level from the inside outwards, wherein between the two main sealing modules provision is made for at least one fluid drain, by means of which a first drain fluid is discharged.

BACKGROUND OF INVENTION

Shaft seals of the aforesaid type are frequently used particularly on turbomachines, which have a shaft which is guided out of the casing and enables the connection of a drive or a driven unit. It lies within the nature of the shaft seal that on account of the relative movement of the shaft surface in relation to the adjacent casing a one hundred percent leaktightness cannot be achieved. Particularly in the case of toxic or explosive process fluids, which are to be kept away from the environment by means of the shaft seal, the leakages must be carefully drained off. Also, in the case of steam turbines or gas turbines, for example, the process fluid is prevented from escaping to the environment by means of such a shaft seal and the leakage of the shaft seal or the amount of suction has a direct influence upon the resulting thermal efficiency. Minimizing the leakages of a shaft seal is one of the most important tasks within the scope of the design of such machines.

In turbocompressors, so-called tandem gas seals frequently undertake the task of sealing the pressure chamber inside the casing in relation to the atmosphere. The tandem gas seals are contactless seals and are lubricated with dry filtered sealing fluid or sealing gas.

A conventional arrangement with a shaft seal of the aforesaid type is represented schematically in FIG. 1. A shaft S extends through a penetration PT of a casing C. In the interior of the casing C there is a process fluid PF under a sealing pressure PPF. The process fluid PF is increased to the sealing pressure PPF by means of a compressor CO. Outside the casing C there is air AM under an ambient pressure PAM. A gap G between the shaft S and the casing C in the region of the penetration PT is sealed by means of a shaft seal SHS. The shaft seal SHS comprises a plurality of sealing modules SM, inter alia two main seals, these being a first main seal MS1 and a second main seal MS2. The two main seals MS1, MS2 are designed as gas seals DG1, DG2 or dry gas seals DGS. Starting from the interior of the casing C, provision is first made for two labyrinth seals, these being a pressure-increasing labyrinth seal LS1 and a second labyrinth seal LS2, between which a pressure-increasing sealing fluid SFP is introduced. The pressure-increasing labyrinth seal LS1 and the pressure-increasing sealing fluid. SFP have the purpose of increasing the sealing pressure to an at least necessary pressure level and are required only if the existing pressure in the compressor is lower than the at least necessary pressure level. Between the first main seal MS1 and the second, outer labyrinth seal LS2, moreover, a sealing fluid is fed into the gap G. As a consequence of the feed of sealing fluid SF, a mass flow is created through the first main seal MS1 to the outside and a mass flow is created through the labyrinth seal LS2 in the direction of the compressor. This mass flow as a rule is relatively low and does not build up any appreciable differential pressure in the labyrinth seal LS2. The mass flow of the pressure-increasing fluid SFP is measured so that together with the mass flow of the sealing fluid SF which flows through the labyrinth seal LS2 it builds up a differential pressure in the pressure-increasing labyrinth seal LS1 which in addition to the pressure in the compressor corresponds to the at least required pressure level. This mass flow flows back into the interior of the casing C. A third labyrinth seal LS3 is provided between the first main seal MS1 and the second main seal MS2. Between the third labyrinth seal LS3 and the second main seal MS2, an intermediate sealing fluid ISF is introduced into the gap G. Whereas the sealing fluid SF is a process fluid PF, the intermediate sealing fluid ISF is either an inert fluid or inert gas or the ambient medium, in most cases being nitrogen.

Between the first main seal MS1 and the second main seal MS2, specifically inwards, of the third labyrinth seal LS3, the mixture of sealing fluid SF and intermediate sealing fluid ISF, or process fluid and inert fluid or ambient fluid, which accumulates there, is drained off to a subsequent process which is not shown in more detail. The process can also be a torch by means of which the mixture is burned off. Frequently located outwards of the second main seal MS2 is an additional tandem arrangement of a labyrinth seal consisting of two seals LS4, LS5, between which a separation fluid SPF is introduced. A mixture of separation fluid SPF and intermediate sealing fluid ISF, which flows in the outwards direction through the second main seal MS2 as leakage, is directed by means of a second drain EX2 to a process or likewise to a torch.

Beneath the sealing arrangement, FIG. 1 shows the pressure pattern over the axial direction, from which results the flow directions through the seals. The dry gas seals are not arbitrarily reversible with regard to throughflow. In this respect, under specific operating conditions an increased amount of pressure-increasing sealing fluid SFP has to be supplied.

The arrangement of the gas seal which is shown in FIG. 1 is also referred to as a tandem gas seal. In the type of construction of the tandem gas seal with or without a labyrinth seal between the two main seals, the intermediate sealing fluid is only required with the type of construction with a labyrinth seal. An intermediate sealing fluid is normally nitrogen from an external source. Both partial amounts of the sealing fluid SF between the main seal MS1 and the additional shaft seal LS2 and partial amounts of the intermediate sealing fluid ISF between the main seal MS2 and an adjacent additional shaft seal LS3 are fed to the first drain EX1, wherein the pressures, as in the pressure pattern which is shown beneath the schematic arrangement in FIG. 1, are selected in such a way that the greater part of the supplied fluid volume finds its way into the first drain EX1. A smaller portion of the intermediate sealing fluid finds its way through the second main seal MS2 into the second drain EX2. The additional shaft seals LS4 and LS5 with the supplied separation fluid SPF essentially serves for shielding the second main seal MS2 against contamination of the environment AM, which may be contaminated as a result of, for example, oil mist from an adjacent bearing. The separation fluid discharges partly into the environment AM and it is partly drained off in the second drain EX2. For the sealing module SM, consisting of the additional shaft seals LS4, LS5, carbon rings or other types of seal can also be used.

In the case of low sealing pressures, it happens that the sealing pressure, by means of the additional pressure-increasing sealing fluid SFP in the first pressure-increasing labyrinth LS1, has to be increased so that there is a pressure gradient towards the first drain EX1. This is especially because the first main seal MS1, which is designed as a gas seal, always requires a pressure gradient from the space which is to be sealed, or from the sealing pressure, in the outward direction so as not to be destroyed with the rotation of the shaft. The second main seal MS2 must also always be acted upon by a pressure gradient $\Delta$ pMS2 in order to ensure a correct function and monitoring. A correct monitoring of a sufficient pressure gradient across the second main seal MS2 also has an important safety aspect in the case of this type of seal because a defective first main seal MS1 is to be determined by pressure increase or quantity increase in the fluid drain EX1 only when the second main seal MS2 is perfectly operational at this point in time. This pressure gradient across the second main seal MS2 is to be added to the pressure gradient $\Delta$ pMS1 and has to be built up in a pressure-increasing labyrinth seal LS1 on the process side. Depending on how high the pressure differential $\Delta$ pLS1 across the pressure-increasing labyrinth seal LS1 has to be increased, considerable amounts of pressure-increasing sealing fluid SFP are required for this purpose. This again impairs the efficiency of the entire plant to a significant degree.

SUMMARY OF INVENTION

An object is to improve the arrangement with the shaft seal of the type referred to in the introduction in such a way that the demand for sealing fluids decreases without leading to losses with regard to leak-tightness and reliability of operation.

For achieving the object, an arrangement and a shaft seal as claimed in the claims are provided.

When the terms inwards or outwards, inside or outside, are used in the following, these direction indications refer to an increasing or decreasing proximity to the interior of the casing and to the exterior of the casing respectively. Particular advantages ensue as a result of the features according to the invention. The amount of sealing fluid is greatly reduced since, compared with the conventional arrangement which is shown in FIG. 1, the pressure differential across the outer, second main seal MS2 no longer has to be additionally built up so that a pressure increase by means of the pressure-increasing sealing fluid in the case of low sealing pressures can be entirely or partially dispensed with. Since the radial double seal requires or creates a pressure gradient of the incoming sealing fluid on both sides, the pressure between the two main seals can be lowered to atmospheric pressure. On account of dispensing with or reducing the pressure increase across the pressure-increasing labyrinth seal LS1, the internal circulating amounts of fluid which is to be compressed are reduced and the volumetric efficiency of a compressor, for example, is improved.

Finally, it becomes possible to monitor the radial double seal as the second main seal directly via the feed of sealing fluid and therefore to ensure the shutdown safety in the event of damage to the first main seal MS1 by means of a pressure monitoring or quantity monitoring in the fluid drain EX1.

Preferably, the stationary carrier of the radial double seal of the second main seal MS2 is pretensioned in the direction of the rotating carrier by means of an elastic element. In this way, the construction of the rotor, being exposed to centrifugal force, is of a less complicated design.

The sealing surface pairs are preferably arranged coaxially so that a simple and space-saving construction is created.

An optimum operation of the sealing arrangement according to the invention provides that the second main seal is exposed to admission of process fluid as sealing fluid.

The first main seal can be designed as a simple dry gas seal. The intermediate sealing fluid in this case is nitrogen, for example. The guarantee that the second main seal has a positive pressure differential on both sides at each operating point and that as a result a stable fluid film is created between the oppositely-disposed sealing surfaces of the sealing surface pairs, is vital. Therefore, the requirement for building up a corresponding pressure in the drain between the main seals is dispensed with.

An advantageous development of the invention provides that a first additional shaft seal LS3, preferably a labyrinth shaft seal, is arranged between the two main seals MS1 and MS2. In this way, it is ensured that no leakages of the first main seal MS1 find their way into the second drain EX2 via the second main seal MS2. In the case of the development with this first additional shaft seal, it is expedient if the first sealing fluid drain is arranged on the inward side of this additional shaft seal between the two main seals.

An advantageous development of the invention provides that between the second main seal MS2 and this aforesaid additional shaft seal LS3, provision is made for a feed of an intermediate sealing fluid ISF.

For the same reasons as the first additional shaft seal can be advantageously arranged between the two main seals, it is expedient to provide a second additional shaft seal, preferably designed as a labyrinth shaft seal, inwards of the first main seal MS1. If the process fluid is laden with particles or other dirt, it is expedient to provide a feed of a flushing fluid, which is preferably purified process fluid, between the first main seal and the second additional shaft seal. This flushing fluid preferably has an overpressure in relation to the process fluid.

For the shielding of the sensitive shaft seal system, it can also be expedient if two shaft seals, preferably labyrinth shaft seals, are additionally arranged in series outwards of the second main seal, these being an inner third additional shaft seal and an outer fourth additional shaft seal. The shielding is especially effective if provision is made for a feed line for a separation fluid between these two additional shaft seals. In the case of this separation fluid, it can be filtered ambient medium. Such an arrangement is especially of interest if provision is made outwards of the entire sealing arrangement for an oil bearing, for example, from which discharging oil mists can find their way into the sealing arrangements and would lead to possibly hazardous fluid mixtures.

The supplied separation fluid can be expediently drained off between the second main seal and the two series-arranged third and fourth additional shaft seals by means of a second drain.

The drains if necessary can be led to a common combustion torch.

BRIEF DESCRIPTION OF THE DRAWINGS

In the following text, the invention is described in more detail based on exemplary embodiments with reference to drawings. In addition to the developments of the invention which are outlined in the exemplary embodiments, for the person skilled in the art additional embodiment possibilities are also gathered from the description. In the drawing:

FIG. 1 shows a schematic representation of a conventional arrangement,

FIG. 2 shows an exemplary representation of a radial double seal,

FIGS. 3 to 4 show in each case an exemplary embodiment of an arrangement according to the invention in a schematic representation.

DETAILED DESCRIPTION OF INVENTION

The arrows beneath sealing modules SM indicate in each case the flow direction which is established during nominal operation. FIG. 2 shows a schematic representation of a radial double seal RDS which seals a gap G between a shaft S and a casing C. In the region of a penetration PT of the shaft S through the casing C, the shaft S is provided with an encompassing shoulder SC which supports a rotating part of the radial double seal RDS. The radial double seal essentially comprises two gas seals DGS1, DGS2, arranged radially in series, which have in each case a rotating sealing surface RSS and a stationary sealing surface SSS which correspondingly create two sealing surface pairs SSP. Between the two sealing surface pairs SSP, a sealing fluid SF is fed into a circumferentially extending chamber SFC which is located there and escapes on account of the overpressure between the rotating sealing RSS and the stationary sealing surface SSS in each case of the two sealing surface pairs SSP. The rotating sealing surfaces RSS and the stationary sealing surfaces SSS of the two sealing surface pairs SSP are interconnected in a fixed manner by means of a common carrier RSUP, SSUP. The stationary carrier SSUP is pretensioned against the rotating carrier RSUP by means of an elastic element EEL.

FIG. 3 shows a development according to the invention of an arrangement consisting of a shaft S, a casing C and a shaft seal SHS comprising a plurality of sealing modules SM. Beginning from the interior of the casing C, a pressure-increasing labyrinth seal LS1, designed as a labyrinth shaft seal, a main seal MS1, designed as a simple dry gas seal, a second main seal MS2, designed as a radial double seal according to FIG. 2, and an arrangement of two additional shaft seals LS4, LS5, which are arranged in series as labyrinth shaft seals, are part of the sealing modules.

The ambient pressure PAM differs from the sealing pressure PPF by a pressure differential ΔPtot in the operating state, which pressure differential ΔPtot, divided into proportions, is applied to the individual sealing modules SM in each case as a partial pressure differential ΔPi. The first main seal MS1 is designed in such a way that the largest partial pressure differential ΔPi, considered across the sealing module in each case, is applied to or built up on this first main seal.

In the interior of the casing C, sealing pressure PPF of a process fluid PF prevails. A seal flushing fluid SPF is fed between the pressure-increasing labyrinth seal LS1 and the first main seal MS1 and features purified process fluid PF with an overpressure in relation to the sealing pressure. This feed prevents contamination of the entire sealing arrangement caused by dirt-laden process fluid PF. If the process fluid should be sufficiently clean and the sealing pressure PPF sufficiently high, the pressure-increasing labyrinth seal LS1 and the second additional shaft seal LS2 can be dispensed with. Between the first main seal MS1 and the second main seal MS2 there is a first drain EX1 which drains off the process fluid PF which flows from the first main seal MS1 to the outside. In the second main seal MS2, sealing fluid SF in the form of nitrogen, for example, with an overpressure is fed so that an outflow ensues both inwards and outwards through the two sealing surface pairs SSP of the radial double seal. Between the second main seal MS2 and the outwardly following seals there is a second drain EX2 which discharges a fluid which originates from the second main seal MS2 and the outwardly following seal combination. Outside the casing is the environment AM under an ambient pressure PAM. A separation fluid SPPF, which drains in both directions and is to prevent any contaminants from outside entering the arrangement, is fed between the two additional shaft seals LS4 and LS5 at the outer end of the arrangement. In the case of the separation fluid SPPF, it is either the purified medium of the environment or an inert fluid, for example nitrogen.

In FIG. 4, the arrangement of FIG. 3 is supplemented by a third additional shaft seal LS3, which is designed as a labyrinth seal, between the two main seals MS1, MS2. The first drain EX1 is located inwards of this additional third additional shaft seal LS3.

An intermediate sealing fluid ISF, for example nitrogen, is introduced between the third additional shaft seal LS3 and the second main seal MS2. As a result of this, the effect is achieved of no sealing fluid SF of the first main seal MS1 being able to find its way to the second main seal MS2.

The pressure pattern shown in FIGS. 3 and 4 over the axial extent of the sealing arrangement shows that the pressure P of the sealing fluid SF which is used lies above the other pressures and consequently a reliable sealing effect is constantly ensured in an operating state.

The invention claimed is:

1. A shaft seal for sealing a gap of a penetration of a shaft through a casing,
   wherein the shaft seal comprises a plurality of sealing modules,
   wherein in the interior of the casing there is a process fluid having a sealing pressure, and outside the casing there is an ambient fluid having an ambient pressure,
   wherein the ambient pressure differs from the sealing pressure by a pressure differential, which pressure differential, divided into proportions, is applied to individual sealing modules of the plurality of sealing modules as partial pressure differentials,
   wherein the plurality of sealing modules comprises a first main seal, wherein a greatest partial pressure differential is applied to the first main seal,
   wherein, between the plurality of sealing modules, a fluid drain is provided for discharging a first drain fluid,
   wherein the first main seal is a simple gas seal and is designed such that, during normal trouble-free operation and during starting and shutting down, the greatest partial pressure differential is applied to the first main seal, starting from the highest pressure level from the inside outwards,
   wherein the plurality of sealing modules comprises a second main seal which is designed such that, in an event of a malfunction of the first main seal, the greatest partial pressure differential is applied to the second main seal, starting from the highest pressure level from the inside outwards, wherein the second main seal is a radial double seal which is defined by two gas seals, each gas seal comprising a sealing surface pair with a rotating sealing surface and a stationary sealing surface, wherein each sealing surface pair is oppositely disposed in a sealing plane, wherein two sealing planes have an essentially radial extent in relation to the shaft, wherein a first sealing surface pair is located on a larger radius than the second sealing surface pair, wherein the stationary sealing surfaces and rotating sealing surfaces of the two sealing surface pairs are fastened in each case on a common carrier which includes a stationary carrier and a rotating carrier, wherein the sealing surfaces of the sealing surface pairs are elastically tensioned towards each other by either the stationary carrier or the rotating carrier being pretensioned by an elastic element, wherein between the two sealing surface pairs a circumferentially extending sealing fluid chamber is arranged for receiving sealing fluid via a sealing fluid feed, and wherein a third shaft seal is arranged between the first and second main seals, wherein a fourth shaft seal is arranged inward of the first main seal, wherein a feed of a flushing fluid is arranged between the first main seal and the fourth shaft seal.

2. The shaft seal as claimed in claim 1, wherein the stationary carrier is pretensioned by the elastic element.

3. The shaft seal as claimed in claim 1, wherein the sealing surface pairs are arranged coaxially to the axial extent of the shaft.

4. The shaft seal as claimed in claim 1, wherein the second main seal is exposed to admission of sealing fluid.

5. The shaft seal as claimed in claim 1, wherein the first fluid drain is arranged on the inward side of the third shaft seal.

6. The shaft seal as claimed in claim 1, wherein a feed of an intermediate sealing fluid is arranged between the second main seal and the third shaft seal.

7. The shaft seal as claimed in claim 1, wherein outward of the second main seal two additional shaft seals are arranged in series, the two additional shaft seals being an inner fifth shaft seal and an outer sixth shaft seal.

8. A shaft seal for sealing a gap of a penetration of a shaft through a casing, wherein the shaft seal comprises a plurality of sealing modules, wherein in the interior of the casing there is a process fluid having a sealing pressure, and outside the casing there is an ambient fluid having an ambient pressure, wherein the ambient pressure differs from the sealing pressure by a pressure differential, which pressure differential, divided into proportions, is applied to individual sealing modules of the plurality of sealing modules as partial pressure differentials, wherein the plurality of sealing modules comprises a first main seal, wherein a greatest partial pressure differential is applied to the first main seal, wherein, between the plurality of sealing modules, a fluid drain is provided for discharging a first drain fluid, wherein the first main seal is a simple gas seal and is designed such that, during normal trouble-free operation and during starting and shutting down, the greatest partial pressure differential is applied to the first main seal, starting from the highest pressure level from the inside outwards, wherein the plurality of sealing modules comprises a second main seal which is designed such that, in an event of a malfunction of the first main seal, the greatest partial pressure differential is applied to the second main seal, starting from the highest pressure level from the inside outwards, wherein the second main seal is a radial double seal which is defined by two gas seals, each gas seal comprising a sealing surface pair with a rotating sealing surface and a stationary sealing surface, wherein each sealing surface pair is oppositely disposed in a sealing plane, wherein two sealing planes have an essentially radial extent in relation to the shaft, wherein a first sealing surface pair is located on a larger radius than the second sealing surface pair, wherein the stationary sealing surfaces and rotating sealing surfaces of the two sealing surface pairs are fastened in each case on a common carrier which includes a stationary carrier and a rotating carrier, wherein the sealing surfaces of the sealing surface pairs are elastically tensioned towards each other by either the stationary carrier or the rotating carrier being pretensioned by an elastic element, wherein between the two sealing surface pairs a circumferentially extending sealing fluid chamber is arranged for receiving sealing fluid via a sealing fluid feed, and wherein a third shaft seal is arranged between the first and second main seals, wherein a fourth shaft seal is arranged inward of the first main seal, wherein outward of the second main seal two additional shaft seals are arranged in series, the two additional shaft seals being an inner fifth shaft seal and an outer sixth shaft seal, wherein a feed of a separation fluid is arranged between the fifth and sixth shaft seal.

9. A shaft seal for sealing a gap of a penetration of a shaft through a casing, wherein the shaft seal comprises a plurality of sealing modules, wherein in the interior of the casing there is a process fluid having a sealing pressure, and outside the casing there is an ambient fluid having an ambient pressure, wherein the ambient pressure differs from the sealing pressure by a pressure differential, which pressure differential, divided into proportions, is applied to individual sealing modules of the plurality of sealing modules as partial pressure differentials, wherein the plurality of sealing modules comprises a first main seal, wherein a greatest partial pressure differential is applied to the first main seal, wherein, between the plurality of sealing modules, a first drain is provided for discharging a first drain fluid, wherein the first main seal is a simple gas seal and is designed such that, during normal trouble-free operation and during starting and shutting down, the greatest partial pressure differential is applied to the first main seal, starting from the highest pressure level from the inside outwards, wherein the plurality of sealing modules comprises a second main seal which is designed such that, in an event of a malfunction of the first main seal, the greatest partial pressure differential is applied to the second main seal, starting from the highest pressure level from the inside outwards, wherein the second main seal is a radial double seal which is defined by two gas seals, each gas seal comprising a sealing surface pair with a rotating sealing surface and a stationary sealing surface, wherein each sealing surface pair is oppositely disposed in a sealing plane, wherein two sealing planes have an essentially radial extent in relation to the shaft, wherein a first sealing surface pair is located on a larger radius than the second sealing surface pair, wherein the stationary sealing surfaces and rotating sealing surfaces of the two sealing surface pairs are fastened in each case on a common carrier which includes a stationary carrier and a rotating carrier, wherein the sealing surfaces of the sealing surface pairs are elastically tensioned towards each other by either the stationary carrier or the rotating carrier being pretensioned by an elastic element, wherein between the two sealing surface pairs a circumferentially extending sealing fluid chamber is arranged for receiving sealing fluid via a sealing fluid feed, and wherein a third shaft seal is arranged between the first and second main seals, wherein a fourth shaft seal is arranged inward of the first main seal, wherein outward of the second main seal two additional shaft seals are arranged in series, the two additional shaft seals being an inner fifth shaft seal and an outer sixth shaft seal, wherein a second drain is arranged between the second main seal and the fifth shaft seal.

10. The shaft seal as claimed in claim 9, wherein the first drain and the second drain lead into a common drain.

11. An arrangement, comprising:

at least one of a gas turbine, a steam turbine, a turbo compressor, or any combination thereof, having a shaft seal for sealing a gap of a penetration of a shaft through a casing, wherein the shaft seal comprises a plurality of sealing modules, wherein in the interior of the casing there is a process fluid having a sealing pressure, and outside the casing there is an ambient fluid having an ambient pressure, wherein the ambient pressure differs from the sealing pressure by a pressure differential, which pressure differential, divided into proportions, is applied to individual sealing modules of the plurality of sealing modules as partial pressure differentials, wherein the plurality of sealing modules comprises a first main seal, wherein a greatest partial pressure differential is applied to the first main seal, wherein, between the plurality of sealing modules, a fluid drain is provided for discharging a first drain fluid, wherein the first main seal is a simple gas seal and is designed such that, during normal trouble-free operation and during starting and shutting down, the greatest partial pressure differential is applied to the first main seal, starting from the highest pressure level from the inside outwards, wherein the plurality of sealing modules comprises a second main seal which is designed such that, in an event of a malfunction of the first main seal, the greatest partial pressure differential is applied to the second main seal, starting from the highest pressure level from the inside outwards, wherein the second main seal is a radial double seal which is defined by two gas seals, each gas seal comprising a sealing surface pair with a rotating sealing surface and a stationary sealing surface, wherein each sealing surface pair is oppositely disposed in a sealing plane, wherein two sealing planes have an essentially radial extent in relation to the shaft, wherein a first sealing surface pair is located on a larger radius than the second sealing surface pair, wherein the stationary sealing surfaces and rotating sealing surfaces of the two sealing surface pairs are fastened in each case on a common carrier which includes a stationary carrier and a rotating carrier, wherein the sealing surfaces of the sealing surface pairs are elastically tensioned towards each other by either the stationary carrier or the rotating carrier being pretensioned by an elastic element, wherein between the two sealing surface pairs a circumferentially extending sealing fluid chamber is arranged for receiving sealing fluid via a sealing fluid feed, and wherein a third shaft seal is arranged between the first and second main seals, wherein a fourth shaft seal is arranged inward of the first main seal, wherein a feed of a flushing fluid is arranged between the first main seal and the fourth shaft seal.

\* \* \* \* \*